US011111179B2

(12) United States Patent
Hertel et al.

(10) Patent No.: US 11,111,179 B2
(45) Date of Patent: Sep. 7, 2021

(54) NON-FIRED MONOLITHS

(71) Applicant: KATHOLIEKE UNIVERSITEIT LEUVEN, Leuven (BE)

(72) Inventors: Tobias Hertel, Herent (BE); Yiannis Pontikes, Kessel-Lo (BE)

(73) Assignee: Katholieke Universiteit Leuven, Leuven (BE)

( * ) Notice: Subject to any disclaimer, the term of this patent is extended or adjusted under 35 U.S.C. 154(b) by 0 days.

(21) Appl. No.: 16/754,290

(22) PCT Filed: Oct. 11, 2018

(86) PCT No.: PCT/EP2018/077785
§ 371 (c)(1),
(2) Date: Apr. 7, 2020

(87) PCT Pub. No.: WO2019/072993
PCT Pub. Date: Apr. 18, 2019

(65) Prior Publication Data
US 2021/0198144 A1 Jul. 1, 2021

(30) Foreign Application Priority Data

Oct. 11, 2017 (GB) .................................. 1716645
Feb. 14, 2018 (GB) .................................. 1802387
Feb. 14, 2018 (GB) .................................. 1802399
Feb. 15, 2018 (LU) .................................. 100702
Feb. 15, 2018 (LU) .................................. 100703

(51) Int. Cl.
*C04B 28/00* (2006.01)
*C04B 18/04* (2006.01)
*C04B 12/00* (2006.01)
*C04B 20/00* (2006.01)
*C04B 14/10* (2006.01)
*C04B 40/02* (2006.01)

(52) U.S. Cl.
CPC .......... *C04B 28/008* (2013.01); *C04B 12/005* (2013.01); *C04B 14/10* (2013.01); *C04B 18/0409* (2013.01); *C04B 20/0048* (2013.01); *C04B 28/005* (2013.01); *C04B 40/024* (2013.01)

(58) Field of Classification Search
CPC ....... C04B 12/04; C04B 12/005; C04B 14/10; C04B 18/0409; C04B 20/0048; C04B 22/062; C04B 28/005; C04B 28/008; C04B 40/024
See application file for complete search history.

(56) References Cited

FOREIGN PATENT DOCUMENTS

| CN | 100363296 C | 1/2008 |
| CN | 101215142 A | 7/2008 |
| CN | 101219883 A | 7/2008 |
| CN | 102276219 A | 12/2011 |
| CN | 103964710 A | 8/2014 |
| CZ | 20003781 A3 | 6/2002 |
| WO | 2016016385 A1 | 2/2016 |

OTHER PUBLICATIONS

O'Connor et al., "A new hydroxide-based synthesis method for inorganic polymers," Journal of Mater Science, 2010, 45, pp. 3284-3288.
Pontikes, et al., "Bauxite residue in cement and cementitious applications: Current status and a possible way forward," Resources, Conservation and Recycling, 73, 2013, pp. 53-63.
Hairi et al., "Synthesis and properties of inorganic polymers (geopolymers) derived from Bayer process residue (red mud) and bauxite," Journal of Mater Science, 2015, 50, pp. 7713-7724.
Gu et al., "Sequential Extraction of Valuable Trace elements from Bayer Process-Derved Waste Red Mud Samples," Journal of Sustainable Metallurgy, 2018, 4(1), pp. 147-154.
International Search Report dated Nov. 19, 2018 in related International Application No. PCT/EP2018/077785 filed Oct. 11, 2018.
International Preliminary Report on Patentability dated Oct. 2, 2019 in related International Application No. PCT/EP2018/077785 filed Oct. 11, 2018.

*Primary Examiner* — Anthony J Green
(74) *Attorney, Agent, or Firm* — Dinsmore & Shohl LLP

(57) ABSTRACT

The invention relates to methods for manufacturing an inorganic polymer object from a precursor wherein the precursor consists of one or more or comprises one or more selected from the group consisting of gibbsite-containing bauxite, gibbsite containing residue of the Bayer process, thermally processed gibbsite-containing bauxite, and thermally processed gibbsite-containing residue of the Bayer process, the method comprising the steps of alkaline-activating said precursor, mixing the precursor, shaping the mixed precursor and hydrothermally curing the shaped precursor at a temperature between 70° C. and 350° C.

20 Claims, 6 Drawing Sheets

NON-FIRED MONOLITHS

CROSS-REFERENCES TO RELATED APPLICATIONS

This application is a national-stage entry under 35 U.S.C. § 371 of International Application Ser. No. PCT/EP/2018/077785, filed Oct. 11, 2018, which international application designates the United States and claims the benefit of priority to Great Britain Patent Application No. 1716645.5, filed Oct. 11, 2017, to Great Britain Patent Application No. 1802387.9, filed Feb. 14, 2018, to Great Britain Patent Application No. 1802399.4, filed Feb. 14, 2018, to Luxembourg Patent Application LU100702, filed Feb. 15, 2018, and to Luxembourg Patent Application LU100703, filed Feb. 15, 2018.

FIELD OF THE INVENTION

The invention relates to the use of gibbsite-containing materials in the production of inorganic polymers, often called as "geopolymers".

BACKGROUND OF THE INVENTION

Hydrothermally cured materials have the advantage that the required energy input is considerable lower compared to processes including firing or thermal pre-treatment of the precursor materials. In the last years, publications on the production of hydrothermally cured bauxite residue (BR) based bricks, which are either cementitious composites or from alkali-activated precursors, were released in the open literature.

In CN100363296 a suggestion is made for the preparation of autoclaved cementitious bricks containing up to 40 wt % BR. Dicalcium silicate ($C_2S$) containing BR was used in combination with other industrial by-products, such as fly ash, CaO-containing carbide slag and calcined phosphogypsum. After mixing with water the pastes were shaped using a hydraulic press (15-25 MPa) and after a precuring step of 12 h at 60° C., samples were autoclaved at 8-12 bar for 8 h up to 190° C. Strengths of 18 to 23 MPa were achieved.

CN102276219B describes the production of BR based (35-43 wt %) concrete bricks in combination with cementitious materials (cement, lime), ground granulated blast furnace slag (GGBFS) and sand among other silica rich materials, such as fly ash. The mixes were pressed in shape and cured under hydrothermal conditions obtaining 15 bars for 6-7 h. Bricks with compressive strengths between 15 and 21 MPa are reported, with satisfying results in durability tests, such as carbonation resistance and frost resistance.

CN101219883B describes the production of autoclaved cementitious bricks consisting of 22-42 wt % BR in mix with 20-40 wt % of fly ash, 20-30 wt % sand, 3-7 wt % gypsum, 6-10 wt % lime. 0.5-1 wt % of $BaSO_4$ were added in order to decrease any potential radioactivity of BR. After a pre-curing step, green bodies were subjected to hydrothermal conditions of 180° C. and 12 bar for 8 h.

Hydrothermal curing was applied in CN101215142 who produced various kinds of cementitious composite bricks with a compositional range of 20-35 wt % of BR, 15-34 wt % fly ash, 30-40 wt % slags, 5-15 wt % carbide slag, 5-12 wt % cement and 0-5 wt % gypsum. Different samples types were produced by varying the shaping pressure (15-40 MPa) and the curing regimes ranging from 1 to 13 bar and 80° C. to 250° C. Compressive strengths up to 20 MPa are reported.

In (O'Connor et al. (2010) J Mater Sci 45, 3284-3288), fine gibbsite (mean particle size of 14 µm) and amorphous microsilica were used as precursors along with an activating solution composed of potassium hydroxide. After curing for 72 h at 40° C., the resulting products were analysed using XRD and $^{27}Al$ and $^{29}Si$ MAS NMR. Unreacted gibbsite was detected in $^{27}Al$ MAS NMR spectra, with a peak at 8-10 ppm, which is characteristic for the octahedral configuration of aluminium in the mineral. Unreacted gibbsite is also detected in the XRD spectra, next to quartz (which was present in microsilica), while no zeolites were formed.

Autoclaved inorganic polymer bricks were synthesised in CN103641402 who used a maximum fraction of 80 wt % of BR in combination with other reactive materials, such as GGBFS, basic oxygen furnace slag, kaolin tailings, coal gangue or 0.5-1 wt % silica fume. The samples were activated using 3-8 wt % of soluble sodium or potassium silicate. The material was extruded and cured in an autoclave at 8-12 bar for 2 to 4 h. The samples showed good resistance to freeze-thaw, no efflorescence and strengths about 20 MPa. Information about the chemical composition of the used BR was not provided in the patent but in view of its origin it has been identified as the high-iron diaspore red mud of the alumina plant of the Quangxi region (Hannian et al. (2018) J. Sust. Metall, 4(1), 147-154)

Hairi et al. (2015) J Mater Sci 50, 7713-7724) used raw as well as calcined bauxite residue as main component for inorganic polymers with the major goal to transform BR into a stable products that can be safely stored. Varying contents of amorphous silica fume (6-26 wt %) and rho-alumina (0-20 wt %) in the solid mix were used to adjust the composition of BR.

SUMMARY OF THE INVENTION

None of the cited prior art discloses a method, where a source rich in gibbsite-containing bauxite or bauxite residue or thermally treated bauxite or bauxite residue was subjected to hydrothermal curing, resulting to dissolution of the phases initially present and the formation of new reaction products, and as a result, a material that is water insoluble and can bear load.

The present invention describes a process to convert inter alia a formulation containing bauxite residue (BR), also known as red mud, into a monolithic, water insoluble, material.

In embodiments of the present invention, the starting solid raw material for the synthesis of the said monolith, consists of bauxite residue, from 60 to 100 wt %, the remaining fraction being (i) a source containing Al in the form of an oxide, hydroxide, oxyhydroxide, silicate, sulphide, sulphate, sulphite, halide, carbonate, phosphate, borate, and mineraloid, or a mixture of them, (ii) a source containing Si in the form of an oxide, hydroxide, oxyhydroxide, silicate, sulphide, sulphate, sulphite, halide, carbonate, phosphate, borate, and mineraloid, or a mixture of them; (iii) a source containing Ca, in the form of an oxide, hydroxide, oxyhydroxide, silicate, sulphide, sulphate, sulphite, halide, carbonate, phosphate, borate, and mineraloid, or a mixture of them.

The aforementioned sources, at the respective fractions, and optionally a solution containing alkalis and water are all intermixed.

In specific embodiments, there is no additional alkali introduced, when the alkaline conditions result from water-soluble constituents present in the initial blend of precursors. In this case, only water needs to be added.

The resulting mixture is then shaped, and the shaped product is cured at a pressure higher than 1 bar and lower than 500 bar and at a temperature ranging from 70 to 350° C., 90° C. and 350° C., between 200° C. and 280° C., between 210° C. and 270° C., or between 215° C. and 265° C. The resulting products are water insoluble, have a compressive strength between 0.5 MPa to 150 MPa, preferably higher than 90 MPa, or between 19 MPa to 81 MPa, or between 28 MPa to 72 MPa or between 36 MPa to 64 MPa and can be used in civil and industrial applications.

The present invention also concerns in general to a process and method of manufacturing hydrothermally-cured materials, generally understood as inorganic polymers or alkali-activated materials, from a gibbsitic precursor, such as lateritic bauxite, the derivable products, and their use. More particular the present invention concerns a non-fired inorganic polymer with compressive strengths between 0.5 MPa to 150 MPa, preferably higher than 90 MPa, or between 19 MPa to 81 MPa, or between 28 MPa to 72 MPa or between 36 MPa to 64 MPa, and comprises less than 15 wt % of diaspore [$\alpha$-AlO(OH)] and/or less than 15 wt % boehmite (or bohmite) [$\gamma$-AlO(OH)]. It furthermore concerns obtaining such non-fired inorganic polymer by modifying the gibbsitic precursor by alkaline activation, press shaping and curing at a temperate temperature between 70 to 350° C., 90° C. and 350° C., between 200° C. and 280° C., between 210° C. and 270° C., or between 215° C. and 265° C., whereby the precursor comprises gibbsite ($\gamma$-Al(OH)$_3$) mineral. The gibbsite in such gibbsitic precursor is in an amount above 2 wt %, between 2 to 80 wt %, between 10 to about 70 wt %, or between 20 to about 60 wt %. Such inorganic polymer has been achieved without the need of subjecting the precursor to a shear such as extrusion. The resulting material is a non-fired monolith.

The objects of the present invention differ from those of Hairi (cited above). As these authors point out: " . . . in the case of the samples derived from red mud, the crystalline components of the starting materials are relatively unreactive, and are present as inert fillers rather than reactants." It seems that especially silica fume contributes to the strength development of the resulting prior art products whereas the alumina addition does not have a positive effect. The crystalline phases (for instance, gibbsite) do not participate in any reaction and also no newly formed crystalline products were detected in these prior art products.

The invention is further summarised in the following statements.

1. A method for manufacturing an inorganic polymer object from a precursor wherein the precursor consists of or comprises one or more selected from the group consisting of gibbsite-containing bauxite, gibbsite-containing residue of the Bayer process (referred to as bauxite residue, also known as red mud), thermally processed gibbsite-containing bauxite, and thermally processed gibbsite-containing residue of the Bayer process, the method comprising the steps of alkaline-activating said precursor, mixing the precursor, shaping the mixed precursor and hydrothermally curing the shaped precursor at a temperature between 70° C. and 350° C.

2. The method according to statement 1, wherein the thermal processing is performed at a temperature between 150° C., 250° C., 500° C. up to 750° C., 1000° c. 1200° C. or any range from one of the lower and upper temperatures.

3. The method according to statement 1 and 2, whereby the precursor comprises in a range of 0-40 wt % one or more of a component selected from the group consisting of quartz sand, silica fume, precipitated silica, natural clay, calcareous sand, thermally-activated clay, chemically-activated clay, mechanically-activated clay, fly ash from bituminous coal, subbituminous coal or lignite, gibbsite-containing electrostatic precipitation dust (ESP dust), aluminium salt cake, processed aluminium dross, $CaCO_3$, $CaO$ and $Ca(OH)_2$, mono-, di- and tricalcium silicate, metallurgical slag (typically originating from copper, lead, zinc, tin, nickel, phosphorous, as well as the alloys in between these metals, in addition to iron, steel and stainless steel production), EN 197-1 blended cement, cement kiln dust, soda-lime-silica glass or other glass compositions, thermally processed bauxite residue and vitreous slag.

4. The method according to any one of statements 1 to 3, wherein the hydrothermal curing is performed under a pressure higher than 1 bar and less than 500 bar, or in the range of 1 bar to 90 bar.

5. The method according to any one of statements 1 or 4, wherein the precursor is consists of a naturally occurring mineral, of a rock, (for instance, the rock of bauxite or a rock consisting of granite, gneiss or basalt) or of a residue from an ore subjected to the Bayer process.

6. The method according to any one of the statements 1 to 5, wherein the precursor contains less than 15 wt % diaspore [($\alpha$-AlO(OH)] and less than 15 wt % boehmite (or bohmite) [$\gamma$-AlO(OH)].

7. The method according to any one of the statements 1 to 6, wherein the normalised chemical composition of the precursor as deduced by X-Ray fluorescence analysis comprises the following elements, expressed as oxides: $Fe_2O_3$ 1-60 wt %, $Al_2O_3$ 5-80 wt %, $SiO_2$ 0 to 50 wt %, $TiO_2$ wt % 0-25, $Na_2O$ 0-20 wt %, CaO 0-20 wt %.

8. The method according to any one of the statements 1 to 7, whereby a loss on ignition or volatile substances of the precursor is in the range of 1 to 50 wt %, 3 to 30, or 3 to 40 wt %, as determined by thermogravimetric analysis carried out at a temperature between 25° C. to 1000° C.

9. The method according to any one of the statements 1 to 8, characterised in that the alkaline activation is induced by an alkaline solution, selected from one or more of the group consisting of hydroxides, silicates, sulphates, sulphides, sulphites, carbonates of Na- and/or K- and/or Ca, spent Bayer liquor, Na-aluminate solution, the liquid component of bauxite residue slurry.

10. The method according to any one of the statements 1 to 9, wherein the alkaline activation is performed by the alkaline solution having a 0.5 to 28 mol/l equivalent concentration for NaOH and a 0.5 to 22 mol/l equivalent concentration for KOH.

11. The method according to any one of the previous statements 1 to 10, wherein the alkaline-activation is performed by a solution that has a total molar ratio of $SiO_2/(Na_2O+K_2O)$ in the range of 0 to 4 and $H_2O/(Na_2O+K_2O)$ in the range of 5-200 or 5-30.

12. The method according to any one of statements 1 to 11, wherein the shaping is performed by casting into a mould, optionally followed by vibration, with a shaping pressure not exceeding 5 MPa.

13. The method according to any one of statements 1 to 12, wherein shaping of the mixed alkali-activated precursor is performed by press-shaping between 5 to 80 MPa, between 30 to 70 MPa or between 40 to 60 MPa.

14. The method according to any one of statements 1 to 13, wherein shaping of the mixed alkali-activated precursor is performed for a time between 1 sec and 10 min, between 5 sec and 8 min, or between 10 sec and 6 min.

15. The method according to any one of the statements 1 to 14, whereby the hydrothermal curing is performed at a temperature between 90° C. and 350° C., between 200° C. and 280° C., between 210° C. and 270° C., or between 215° C. and 265° C.

16. The method according to any one of the statements 1 to 15, wherein the precursor comprises no or less than 0.01 wt % water-soluble sodium or potassium silicate.

17. The method according to any one of the previous statements 1 to 16, wherein precursor comprises no or less than 0.1 wt % fluoride.

18. The method according to any one of the statements 1 to 17, where the precursor is free from, or comprises less than 0.01 wt % of one or more species selected from the group consisting of ground granulated blast furnace slag, basic oxygen furnace slag, kaolin tailings, coal gangue and silica fume [for instance comprises less than or 0.01 wt % of such species].

19. The method according to any one of statements 1 to 18, further comprising fibres in a range of 0.05 and 0.3% by weight of the precursor.

20. A shaped inorganic polymer object obtained according to any one of the previous statements 1 to 19.

21. Use of an inorganic polymer object, obtained by a method according to one of statements 1-19, in building or construction applications.

22. The use according to statement 21, wherein said object is a brick, a block, a tile, a panel, a post, a beam, a slab, a girder, a column, a wall, and any other structural elements.

23. The use according to statement 21 or 22, wherein the object has the appearance of a stone or stone like material such like granite or marble and the likes or resembling fired clay ceramics, like bricks.

24. A non-fired, water insoluble inorganic polymer object comprising less than 2 wt % gibbsite and comprising more than 15 wt %, up to 50 wt %, up to 75 wt % or up to 80% of the combination of $Al_2O_3$ and $Fe_2O_3$, characterised in that said inorganic polymer object comprises one or more of amorphous phases in terms of crystalline structure, zeolites, carbonates and calcium silicate hydrates. Herein for example for the value of 15% "more than 15 wt % of the combination of $Al_2O_3$ and $Fe_2O_3$" means that the polymer may comprise any $Al_2O_3Fe_2O_3$ mixture ranging from 0 wt % $Al_2O_3$ and 15% wt $Fe_2O_3$ up to 0 wt % $Al_2O_3$ and 15% wt $Fe_2O_3$. In general within in a mixture of $Al_2O_3$ and $Fe_2O_3$, the amount of $Al_2O_3$ may thus for example 0, 10, 25, 50, or 75 wt %.

25. The object according to claim 24 wherein the presence of amorphous phases in terms of crystalline structure, or zeolites or carbonates are defined by XRD and/or NMR analysis.

26. The object according to claim 24 or 25, comprising no gibbsite.

27. The object according to any one of claims 24 to 26, comprising amorphous phases in terms of crystalline structure and one or more of carbonates zeolites, carbonates and calcium silicate hydrates.

28. The object according to any one of claims 24 to 27, comprising amorphous phases in terms of crystalline structure and zeolites and carbonates.

29. The object according to any one of claims 24 to 28, wherein the zeolite is analcime.

30. The object according to any one of claims 24 to 29, wherein the carbonate is cancrinite.

31. The object according to any one of claims 24 to 30, which is a brick, a block, a tile, a panel, a post, a beam, a slab, a girder, a column, a wall.

32. The object according to any one of claims 24 to 31, wherein the object has the appearance of a stone or stone like material such like granite or marble and the likes or resembles fired clay ceramics, like bricks.

DETAILED DESCRIPTION OF THE INVENTION

Drawing Description

Brief Description of the Drawings

The present invention will become more fully understood from the detailed description given herein below and the accompanying drawings which are given by way of illustration only, and thus are not limitative of the present invention, and wherein.

Figure 1:
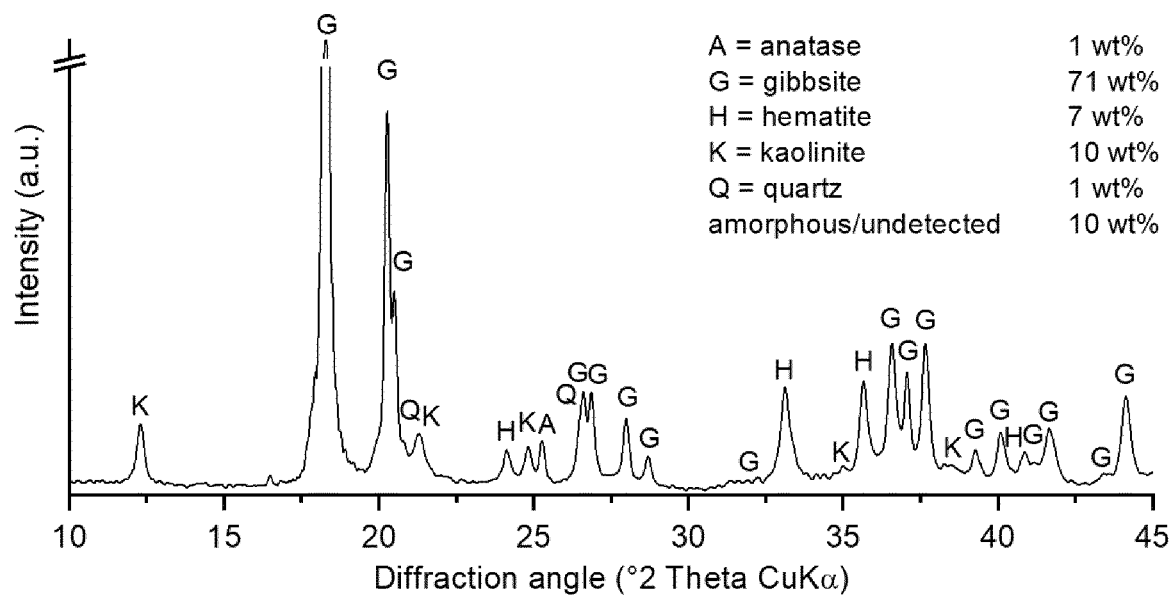
FIG. 1. shows a qualitative X-ray diffractogram of gibbsitic bauxite.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Several documents are cited throughout the text of this specification. Each of the documents herein (including any manufacturer's specifications, instructions etc.) are hereby incorporated by reference; however, there is no admission that any document cited is indeed prior art of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to the devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

LOI stand for loss on ignition. Loss on ignition is a test used in analytical chemistry, particularly in the analysis of minerals. It comprises strongly heating ("igniting") a sample of the material at a specified temperature, allowing volatile substances to escape, until its mass ceases to change.

A mineral in the meaning of this application is a naturally occurring chemical compound, usually of crystalline form and abiogenic in origin. Such mineral in the meaning of this application has one specific chemical composition, whereas a rock in the meaning of this application is an aggregate of different minerals or mineraloids.

Silica fume is also known as microsilica, (such as silica fume with CAS number 69012-64-2, EINECS number 273-761-1) is an amorphous (non-crystalline) polymorph of silicon dioxide, silica. Mostly is an ultrafine powder collected as a by-product of the silicon and ferrosilicon alloy production and comprises spherical particles with an average particle diameter of 150 nm.

Waterglass is in the meaning of sodium silicate, the common name for compounds with the formula $(Na_2SiO_2)$ nO, such as for instance sodium metasilicate, $Na_2SiO_3$. These materials are available in aqueous solution and in solid form. The pure compositions are colourless or white, but commercial samples are often greenish or blue owing to the presence of iron-containing impurities.

In accordance with the purpose of the invention, as embodied and broadly described herein, the invention is broadly drawn to the low temperature production of an inorganic polymer from a gibbsite containing $(\gamma\text{-}Al(OH)_3)$ precursor, shaped it into a monolith. It was found that materials containing only diaspore $[(\alpha\text{-}AlO(OH)]$ and/or boehmite (or bohmite) $[\gamma\text{-}AlO(OH)]$ were less preferable. The material used has practically no fluoride in its composition. Moreover, we found there is no need to subject the material in shear processing, such as extrusion and additives such as silica fume or water glass may assist the process but are not required to obtain the effect of present invention.

The process allowed producing a new inorganic polymer with adequate compressive strength for a range of applications, that is between 0.5 MPa to 150 MPa, preferably higher than 90 MPa, or between 19 MPa to 81 MPa, or between 28 MPa to 72 MPa or between 36 MPa to 64 MPa. As diaspore and boehmite do not help substantially the process this new inorganic polymer of present invention contain less than 15 wt % diaspore and/or less than 15 wt % boehmite.

In one aspect of the invention, the precursor gibbsitic materials comprising gibbsite is in an amount above 2 wt %, for instance between 2 to 80 wt %, preferably between 10 to about 70 wt % and more preferably between 20 to about 60 wt %, of the precursor where in order to obtain the inorganic polymer with the above described characteristics subjected to alkaline activation, press shaping and curing at a low temperate temperature between 70 to 350° C. or 90 to 350° C., preferably between 200° C. and 270° C. Such inorganic polymer can be pressed-shape into non-fired monoliths that are suitable for construction, building, bridging or supporting a structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed. In yet another aspect such inorganic polymer characterised is obtainable by modifying of a precursor by alkaline activation, press shaping and curing at a low temperate temperature between 70 to 350° C. or 90 to 350° C., between 200° C. and 280° C., between 210° C. and 270° C., or between 215° C. and 265° C., whereby the precursor comprises gibbsite γ-Al(OH)$_3$) and whereby this gibbsite is in an amount above 2 wt %, between 2 to 80 wt %, between 10 to about 70 wt %, or between 20 to about 60 wt %, of the precursor and that the inorganic polymer has a compressive strength of this inorganic polymer between 0.5 MPa to 150 MPa, between 15 MPa to 90 MPa, between 19 MPa to 81 MPa, between 28 MPa to 72 MPa or between 36 MPa to 64 MPa. A further aspect is that this inorganic polymer has been pressed into a non-fired monolith. Yet another aspect provides such this inorganic polymer comprises less than 15 wt % of diaspore [(α-AlO(OH)] and/or less than 15 wt % boehmite (or bohmite) [γ-AlO(OH)] or comprises no diaspore and/or no boehmite, comprising less than 0.1 wt % fluoride or comprises no fluoride. Another aspect is that this inorganic polymer has been press-shaped at a pressure of at least 5 MPa, preferably at least 10 MPa, yet more preferably at least 20 MPa for instance at a pressure in the range of to 40 to 60 MPa and by pressing for a time between 1 sec and 2 min, between 5 sec and 5 min, between 20 sec and 10 min, between 25 sec and 8 min, between 30 sec and 6 min, for a time between 35 sec and 4 min or between 40 sec and 2 min. Preferably this precursor is processed without extrusion, but has been obtained by pressing of the precursor or by casting. A further aspect is that this inorganic polymer of the above statements has a normalised chemical composition of the precursor expressed as oxides and in the range of Fe$_2$O$_3$ 1-60 or 0-60 wt %, Al$_2$O$_3$ 5-80 wt %, SiO$_2$ 0-50 wt %, TiO$_2$ 0-20 wt %, Na$_2$O 0-20 wt %, CaO 0-20 wt %. In yet another aspect, this inorganic polymer has a particular characteristic that the loss on ignition or volatile substances of the precursor is in the range of 1 to 50 wt %, 3 to 40 wt %, 3 to 50 wt % or 3 to 30 wt % as defined or definable by thermogravimetric analysis carried out at a temperature between 25° C. to 1000° C. The mineral mix is specific embodiments in total or in part from an ore, a naturally occurring mineral, or a rock for instance a rock of the group consisting of granite, gneiss and basalt or the mineral mix is from an ore, a naturally occurring mineral, or a rock without additional additives or the mineral mix is from an ore, a naturally occurring mineral, or a rock without additional additives other than kaolinite in a range of 0-40 wt % or 10-15 wt % or the mineral mix is from an ore, a naturally occurring mineral, or a rock without additional additives other than a ceramic clays or mineral clay in a range of 0-40 wt % or 10-15 wt % or it comprises any one of the group consisting of anatase, rutile, gibbsite, hematite, kaolinite and quartz or a combination thereof. In a particular aspect the inorganic polymer is characterised in that it comprises anatase, rutile, hematite, goethite, kaolinite and quartz. Typically if the inorganic polymer comprises anatase, rutile, hematite, kaolinite and quartz, for instance it comprises anatase and rutile each independently from each other in an amount between 0 wt % to 2.00 wt %, 0.5 wt % to 1.50 wt % or 0.75 to 1.25 wt %, hematite and goethite each independently from each other in an amount between 0 wt % to 60 wt %, 10 wt % to 60 wt %, 15 wt % to 40 wt %, 16 wt % to 30 wt % or 16.5 wt % to 25 wt %, kaolinite in an amount between 0 wt % to 15 wt %, 3 wt % to 14 wt %, 5 wt % to 13 wt %, 7 wt % to 12 wt % or 9 wt % to 11 wt %, quartz in an amount between 0 wt % to 20 wt %, 3 wt % to 15 wt %, 5 wt % to 14 wt %, 7 wt % to 13 wt %, 8 wt % to 12 wt % or 9 wt % to 11 wt %, comprises amorphous substances in an amount between 3 to about 50 wt % or 5 to 15 wt % or 5 to 30 wt % or 3 to 30 wt %.

According to another exemplary embodiment the inorganic polymer according to any one of the previous statements is hydrothermally cured at a temperature between 70° C. and 350° C., 90° C. and 350° C., between 200° C. and 280° C., between 210° C. and 270° C., or between 215° C. and 265° C. In a particular aspect the starting material to obtain such inorganic polymer is a precursor composition with particle size smaller than 10 mm, preferably between 0.001 μm and 1500 μm size. A particular aspect of such precursor composition is that it comprises less than 15 wt % of diaspore [(α-AlO(OH)] and less than 15 wt % boehmite (or bohmite) [γ-AlO(OH)] or comprises no diaspore and/or no boehmite, it comprises less than 1 wt % of silica fume or comprises no silica fume, it comprises less than 5 wt % water glass or comprises no water glass, it comprises less than 0.1 wt % fluoride or comprises no fluoride. Yet another particular aspect of such precursor mineral composition is that it does not comprise diaspore [α-AlO(OH)] and/or boehmite [γ-AlO(OH)] and/or it does not comprise silica fume.

The above-mentioned inorganic polymer is in one aspect characterised in that the mineralogical composition of the inorganic polymer or its precursor is defined or definable as a X-ray diffractogram by using X-ray Powder Diffraction (XRD) and/or the above-mentioned inorganic polymer is in one aspect characterised in that the inorganic polymer or its precursor is defined or definable as a X-ray diffractogram recorded for instance by a D2 Phaser (Bruker AXS), the software DiffracPlus EVA in combination with data of the ICCD-PDF-2 database and/or the normalised chemical composition of the precursor or the inorganic polymer is defined or definable by sequential wavelength-dispersive XRF spectrometer, for instance an automatic PW 2400 sequential wavelength-dispersive XRF spectrometer and further software analysis, for instance by Uniquant 5. The above-mentioned inorganic polymer is in yet an aspect characterised in that the alkaline activation is by an alkaline solution for instance by an alkaline mixture of sodium of a 0.5 to 28 M (mol/l) or that the alkaline activation has a total molar ratio of SiO$_2$/Na$_2$O in the range of 0 to 4 and H$_2$O/Na$_2$O in the range of 5-200 or 10-30. The above-mentioned inorganic polymer is in yet an aspect characterised in that the alkaline activation is by an alkaline solution for instance by an alkaline mixture of potassium of a 0.5 to 22 M (mol/l) or that the alkaline activation has a total molar ratio of SiO$_2$/K$_2$O in the range of 0 to 4 and H$_2$O/Na$_2$O in the range of 5-200 or 5-30. Mixtures of Na and K hydroxides and silicates are also included in the present invention, in combination with sulphates, sulphides, sulphites, carbonates and Ca-hydroxides and Ca-silicates, spent Bayer liquor, sodium aluminate solution, slurry of bauxite residue.

The above-mentioned inorganic polymers are suitable for construction, building, bridging, supporting a structure and are manufactured as a non-fired building material comprising the inorganic polymer of present invention.

It is intended that the specification and examples be considered as exemplary only. Each and every claim is incorporated into the specification as an embodiment of the present invention. Thus, the claims are part of the description and are a further description and are in addition to the preferred embodiments of the present invention.

Each of the claims set out a particular embodiment of the invention. The following terms are provided solely to aid in the understanding of the invention.

The Raw Materials of Present Invention

By bauxite, it is implied a naturally occurring, heterogeneous weathering product composed primarily of one or more aluminum hydroxide minerals, plus various compounds containing Si, Fe, Ti, and other impurities in minor or trace amounts. The principal aluminum hydroxide minerals found in varying proportions within bauxite are gibbsite $\gamma$-Al(OH)$_3$, and the polymorphs diaspore and boehmite, being [$\alpha$-AlO(OH)] and [$\gamma$-AlO(OH)], respectively. The content of equivalent $Al_2O_3$ is >30 wt %.

By bauxite residue, also known as red mud, it is implied the insoluble slurry residue generated during the digestion of bauxite in the alumina producing Bayer process. Bauxite residue slurries are strongly alkaline, and have a reasonably high electrical conductivity and ionic strength. In the process herein, the bauxite residue has >20 wt % $Fe_2O_3$, >5 wt % $Al_2O_3$, and <30 wt % free $H_2O$. The major minerals found in bauxite residue are listed in Table 1 of Pontikes & Angelopoulos (2013) *Resources, Conservation and Recycling* 73, 53-63. Among others, the bauxite residue of the present invention has gibbsite as one of the minerals present, at a level >2 wt %. Bauxite residue can be used after dewatering or after being already disposed, with subsequent drying and/or farming and/or thermal treatment. Upon thermal treatment, the gibbsite content may well be <2 wt %.

By source of Al, an oxide, hydroxide, oxyhydroxide, silicate, sulphide, sulphate, sulphite, halide, carbonate, phosphate, borate, and mineraloid, or a mixture of the above, found in rocks, minerals, by-products and residues, belonging to the following group, is implied: bauxite, containing >2 wt % gibbsite, ideally >20 wt %; clays, as found in nature or thermally or chemically or mechanically activated, preferably containing >10 wt % kaolinite, ideally >20 wt %; fly ash from bituminous coal, subbituminous coal or lignite, preferably containing >10 wt % $Al_2O_3$ equivalent, ideally >20 wt %; aluminium salt slag (also known as aluminium salt cake); gibbsite-containing electrostatic precipitation dust (ESP dust), preferably containing >10 wt % $Al_2O_3$ equivalent, ideally >20 wt %, as well as processed aluminium dross, preferably containing >10 wt % $Al_2O_3$ equivalent, ideally >20 wt %.

By source of Si, an oxide, hydroxide, oxyhydroxide, silicate, sulphide, sulphate, sulphite, halide, carbonate, phosphate, borate, and mineraloid, or a mixture of the above, found in rocks, minerals, by-products and residues, belonging to the following group is implied: quartz sand, silica fume, precipitated silica; clays, as found in nature or thermally or chemically activated, preferably containing >10 wt % kaolinite, ideally >20 wt %; fly ash from bituminous coal, subbituminous coal or lignite, preferably containing >10 wt % $Al_2O_3$ equivalent; soda-lime-silica glass and any other type of glass, including vitreous slags, containing >20 wt % $SiO_2$ equivalent.

By source of Ca, an oxide, hydroxide, oxyhydroxide, silicate, sulphide, sulphate, sulphite, halide, carbonate, phosphate, borate, and mineraloid, or a mixture of the above, found in rocks, minerals, by-products and residues, belonging to the following group is implied: $CaCO_3$, CaO and $Ca(OH)_2$, cement of any kind, including blended cements as defined in EN 197-1 and residues produced during the cement making process, for example cement kiln dust, as well as iron, steel and stainless steel slags.

Where by defining wt % equivalent, it is implied the weight percent of that particular element, as calculated by XRF measurements and converted to oxides.

And where wt % of phases are mentioned, it is implied the weight percent of that particular phase, as calculated by quantitative XRD, or comparable methodologies.

By a solution containing alkalis, the following solutions are implied: sodium or potassium-silicate, -carbonate, -sulphate, -sulphide, -sulphite or a mixture of any of the above, including solutions without any silicates present.

As all skilled in the art would acknowledge, in each of the three streams mentioned above, next to the element specified (Al, Si, Ca) a range of other components is introduced as well. Thus, the list above is not exhaustive, and mixed streams including (but not limited to) thermally processed bauxite residue, construction and demolition wastes, ashes from municipal solid waste treatment facilities and other incineration processes, landfill mining residues, processed or not, metallurgical slags originating from copper, lead, zinc, tin, nickel, phosphorous, as well as from the production of alloys of these metals, are also included in the embodiments.

The Process of Present Invention

The production process comprises the following steps: mixing, dewatering/drying, alkali-activation, shaping, and curing. The steps of mixing, dewatering/drying and alkali-activation are sequential and can be in the order above or any other order, where for example the dewatering/drying precedes that of mixing, or where the alkali-activation precedes mixing and dewatering/drying.

Mixing takes place in a vessel where the bauxite residue, and the streams containing Si, Al and Ca are blended together in order to homogenise them. This can occur by the mechanical action of one of more shafts, auger screw, or other rotational, planetary, etc. mechanisms that will induce convective and/or intensive mixing. Mixing can take place at a state where the $H_2O$ content does not exceed 30 wt %, or at a slurry state, where water exceeds 30 wt %. Examples of mixer include, but are not limited to, paddle, ploughshare, roller pan, planetary and high shear ones. The solution containing the alkalis is introduced herein. Aggregates can be also introduced herein, that being defined as a material with particle sizes exceeding 100 microns, preferably 250 microns, with a part exceeding 500 microns.

After the mixing step, dewatering or drying may be necessary, depending on the water content in the mixing step. This can occur, but not limited to, by a filter-press, a drum filter, a belt filter, or other similar configurations, followed by any of the known drying methods. This step produces the right consistency for the next step, that of shaping.

In the process variable where dewatering/drying preceded the step of mixing, similar apparatus to the ones described above are used. In this process, the alkaline solution is introduced while mixing.

In one embodiment, the step that follows concerns a semi-dry shaping process. In this approach, the blend that has resulted before is dried to a water level not exceeding 10 wt %, milled and then pressed in a hydraulic, or a mechanical press. Additional water or alkali solution can be introduced while mixing, preferably by spray nozzles. In another embodiment, the step that follows concerns a semi-liquid shaping process. In this approach, the blend that has resulted before is dried to a water level not exceeding 30 wt %, and is then casted, extruded or pressed in a vibrating press. Additional water or alkali solution can be introduced while mixing. In both embodiments mentioned above, shaping can take place by any of the established techniques in the fields of concrete shaping, ceramic shaping, and aggregate shaping, such as by the so-called intensive mixers, and is not limited to the ones mentioned before.

In both embodiments mentioned above, the principles of ultra-high strength concrete design are followed, for example, coarse aggregates are excluded and the particle size distribution is designed in a way aiming to achieve high particle packing. In certain embodiments, one or more fine and/or ultrafine reactive fillers may be used having a particle size of between about 1 to 100 µm, whereas in other embodiments, submicron fillers with a particle size ranging from about 0.05 to about 5 µm may be used.

The resulting material is subsequently cured at elevated temperature and pressure. This is occurring at an autoclave vessel. The temperature ranges from 70° C. to 350° C. or 90° C. and 350° C., between 200° C. and 280° C., between 210° C. and 270° C., or between 215° C. and 265° C. and the pressure ranges from higher than 1 bar to 500 bar. As an atmosphere in the autoclave, a concentration of $CO_2$>0.1 vol % will be satisfactory.

It was demonstrated in the present study that stable inorganic polymers with promising mechanical properties can be synthesised from bauxite and bauxite residue. The alkaline activator dissolves under hydrothermal conditions the alumina hydrates, reactive silicates and quartz, leading to a release of reactive aluminate and silicate species which form dense, inorganic polymers. The reaction products are amorphous in terms of crystalline structure and comprise zeolites, such as analcime, and/or carbonates, such as cancrinite.

The described process allows the use of raw materials which are available within alumina plants. Low-grade, high silica bauxites which are not suitable for alumina production are favoured as precursors in that context. Also bauxite residue has proven its potential to give inorganic polymers. Optional additions like clays or sand even improve the mechanical properties of the produced materials.

Embodiments of the present invention provides an inorganic polymer lacking fluoride or comprising only a trace of fluoride for instance less than 0.1 wt % fluoride and comprises less than 10 or less than 15 wt % of diaspore [($\alpha$-AlO(OH)] and less than 10 or less than 15 wt % boehmite (or bohmite) [$\gamma$-AlO(OH)] or comprises no diaspore and/or no boehmite. This is obtainable by modifying of a precursor by alkaline activation, press shaping and curing at a low temperate temperature between 70 to 350° C. or 90 to 350° C., between 200° C. and 280° C., between 210° C. and 270° C., or between 215° C. and 265° C., whereby the precursor comprises gibbsite ($\gamma$-Al(OH)$_3$) minerals and whereby this gibbsite is in an amount above 2 wt %, between 5 to 80 wt %, between 10 to about 70 wt %, or between 20 to about 60 wt %, of the precursor and that the inorganic polymer has a compressive strength between 0.5 MPa and 150 MPa or between 15 and 90 MPa, between 19 MPa to 81 MPa, between 28 MPa to 72 MPa or between 36 MPa to 64 MPa. Such inorganic polymer can be achieved with the above process without the need of subjecting the shear. The material can be produced into non-fired monoliths.

According to one embodiment the inorganic polymer of the present invention comprises any one of the group consisting of anatase, rutile, gibbsite, hematite, goethite, kaolinite and quartz or a combination thereof or it is characterised in that it comprises anatase, rutile, hematite, kaolinite and quartz, for instance it comprises anatase and rutile each independently from each other in an amount between 0 wt % to 2.00 wt %, 0.5 wt % to 1.50 wt % or 0.75 to 1.25 wt %, hematite and goethite each independently from each other in an amount between 0 wt % to 60 wt %, 15 wt % to 40 wt %, 16 wt % to 30 wt % or 16.5 wt % to 25 wt %, kaolinite in an amount between 0 wt % to 15 wt %, 3 wt % to 14 wt %, 5 wt % to 13 wt %, 7 wt % to 12 wt % or 9 wt % to 11 wt %, quartz in an amount between 0 wt % to 20 wt %, 3 wt % to 15 wt %, 5 wt % to 14 wt %, 7 wt % to 13 wt %, 8 wt % to 12 wt % or 9 wt % to 11 wt %, comprises amorphous substances in an amount between 3 to about 50 wt % or between 3 to about 30 wt %

In a further embodiment of the invention, the inorganic polymer of present invention has a normalised chemical composition of the precursor comprises oxides and in the range of $Fe_2O_3$ 0-60 or 1-60 wt %, $Al_2O_3$ 5-80 wt %, $SiO_2$ 0-20 wt %, $TiO_2$ wt % 0-20, $Na_2O$ 0-20 wt %, CaO 0-15 wt % as can be analysed by normalised chemical composition of the precursor or the inorganic polymer is defined or definable by sequential wavelength-dispersive XRF spectrometer, for instance an automatic PW 2400 sequential wavelength-dispersive XRF spectrometer and further Uniquant 5 software analysis.

This embodiment of the invention advantageously starts form a precursor mineral mix that is in total or in part from an ore, a naturally occurring mineral, or a rock for instance a rock of the group consisting of granite, gneiss and basalt for instance from an ore, a naturally occurring mineral, or a rock without additional additives;

an ore, a naturally occurring mineral, or a rock without additional additives other than kaolinite in a range of 0-40 wt % or of 5-15 wt % or an ore, a naturally occurring mineral, or a rock without additional additives other than a ceramic clays or mineral clay in a range of 0-40 wt % or 5-15 wt %.

In yet another advantageous embodiment the precursor mineral composition has a particle size smaller than 10 mm, preferably between 0.001 µm and 1000 µm preferably the precursor mineral composition comprises less than 15 wt % of diaspore [($\alpha$-AlO(OH)] and/or less than 15 wt % boehmite (or bohmite) [$\gamma$-AlO(OH)], the precursor mineral composition comprises less than 0.01 wt % of silica fume or comprises no silica fume and/or the precursor mineral composition comprises less than 0.01 wt % water glass or comprises no water glass and/or the inorganic polymer according to any one of the previous claims, characterised in that the precursor mineral composition comprises less than 0.01 wt % fluoride or comprises no fluoride and/or the precursor mineral composition does not comprise diaspore [($\alpha$-AlO(OH)] and/or boehmite.

It was found that loss on ignition or volatile substances of such suitable precursor described above was in the range of 1 to 50 wt %, 3 to 30 wt % or 3 to 40 wt % as defined or definable by thermogravimetric analysis carried out at a temperature between 25° C. to 1000° C., for instance by a SDT Q600 thermogravimetric analysis instruments. It could be characterised that the amorphous substances comprise between, in approximation, 0 wt % to 50 wt %, 3 to 50% or 5 wt % to 15 wt % or 5 wt % to 30 wt %.

Beside the use of a suitable precursor object, the present invention is achieved by means of a suitable method of manufacture. In a particular embodiment the precursor has been shape-pressed at a pressure of at least 20 MPa; the precursor has been press-shaped at a pressure in the range of to 40 to 60 MPa and pressing time is between 20 sec and 10 min, between 25 sec and 8 min, between 30 sec and 6 min, for a time between 35 sec and 4 min or between 40 sec and 2 min.

The present invention also provides that the inorganic polymer according to present invention can be obtained from an alkaline activated and pressed precursor that has been hydrothermally cured at a temperature between 70° C.

and 350° C., 90 to 350° C., between 200° C. and 280° C., between 210° C. and 270° C., or between 215° C. and 265° C., whereby the shaping pressure was between 20 to 80 MPa, 30 to 70 MPa or 40 to 60 MPa and the alkaline activation is by an alkaline solution composed of Na- and/or K- and/or Ca-hydroxides, silicates, sulphates, sulphides, sulphite, carborates, and mixtures of them. In the afore mentioned solution, the sodium concentration in the solution ranges from 0.5 to 28 mol/l and the potassium concentration in the solution ranges from 0.5 to 22 mol/l, the total ratio of $SiO_2/(Na_2O+K_2O)$ is in the range of 0 to 4 and $H_2O/(Na_2O+K_2O)$ is in the range of 5-200 or 5-30.

In an advantageous embodiment, the inorganic polymer according to the present invention is further used for construction, building, bridging, supporting a structure.

Particular and preferred aspects of the invention are set out in the accompanying independent and dependent claims. Features from the dependent claims may be combined with features of the independent claims and with features of other dependent claims as appropriate and not merely as explicitly set out in the claims.

Thus, the claims following the detailed description are hereby expressly incorporated into this detailed description, with each claim standing on its own as a separate embodiment of this invention.

EXAMPLES

Example 1: Experimental Methods

Materials

One of the raw material used in this study was gibbsitic bauxite. After drying, it was milled in a ball mill (Retsch PM400) in order to pass a 160 μm mesh size.

Further, gibbsitic BR slurry was used. Before further processing the slurry was vacuum-filtered (under 45 μm) and the obtained cake was dried for 48 h at 105° C. and milled in a disk mill (Fritsch Pulverisette) to break agglomerates.

Two kinds of clays, an industrial clay and a natural kaolin, originated from a deposit in south-west England were used in this study. Both clays were dried for 48 h at 105° C. The industrial clay was milled below <160 μm using a vibratory disk mill (Retsch RS200).

Example 2: Characterization of Raw Materials

The chemical composition of above-mentioned raw materials was measured using an automatic PW 2400 sequential wavelength-dispersive XRF spectrometer (Phillips) and analyzed with the software Uniquant 5 (Omega Data Systems BV). X-ray diffractograms were recorded in order to determine the mineralogical composition using a D2 Phaser (Bruker AXS) and the software DiffracPlus EVA in combination with data of the ICCD-PDF-2 database. Thermogravimetric Analysis, TGA (measurement of weight change) was carried out up to 1000° C. using a SDT Q600 (TA Instruments) in order to determine the loss on ignition.

Example 3: Preparation of Solid Precursor Mixes and Na-Based Activation Solutions Five different mixes were prepared comprising different fractions of gibbsitic bauxite, gibbsitic BR, the industrial clay and kaolin (Table 1).

TABLE 1

Mix compositions tested.

| Mix | | A | B | C | D | E |
|---|---|---|---|---|---|---|
| gibbsitic bauxite | wt % | 100 | — | 10 | — | — |
| gibbsitic BR | wt % | — | 100 | 90 | 90 | 90 |
| industrial clay | wt % | — | — | — | 10 | — |
| Kaolin | wt % | — | — | — | — | 10 |

Samples were mixed in ethanol using a Turbula Shaker (WAB, Switzerland). Before further processing, ethanol was removed by vacuum evaporation.

Two different types of activator were prepared to investigate the potential influence on the characteristics of the later products. Alkaline solution I was prepared by mixing 70 wt % sodium silicate solution (m $SiO_2/Na_2O$=3.3, 65% $H_2O$) and 30 wt % NaOH (16 M). The total ratio of $SiO_2/Na_2O$=1.4 and $H_2O/Na_2O$=13.

Solution II was prepared by blending 70 wt % sodium silicate solution (m $SiO_2/Na_2O$=3.3, 65% $H_2O$) with 30 wt % NaOH (8 M) resulting in ratios of $SiO_2/Na_2O$=1.8 and $H_2O/Na_2O$=18.4.

Example 4: Production of Inorganic Polymer Materials

For the production of the samples, dry mixes were first sieved <120 μm and subsequently mixed with the alkaline solution I according to a solution to solid ratio of 0.2. Homogenization was carried out using an electric handheld mixer for 5 min in total. Forming agglomerates were broken in between to assure homogenous distribution of the solution. The dry pastes were introduced in metallic moulds (dimensions: 2×2×8 cm$^3$) and pressed (hydraulic press: Carver, Inc, USA) maintaining a pressure of either 19 MPa, 50 MPa or 192 MPa for 1 min. The choice of pressing the samples for shaping leads to a decreased requirement of alkaline solution compared to castable pastes. Potentially, a low degree of porosity, a higher degree of reaction and thus more stable products can be achieved compared to casting. The pressed articles were subsequently subjected to curing for 24 h under hydrothermal conditions using an autoclave cell filled with distilled water which was positioned in a laboratory oven. Different temperatures and thus pressure regimes were screened. A compilation of the produced samples, moulding pressure and curing temperature are listed in Table 2.

TABLE 2 provides the produced brick samples and applied moulding pressure and curing temperature (alkaline solution I).

| Shaping pressure | Temperature | A | B | C | D | E |
|---|---|---|---|---|---|---|
| 19 MPa | 220° C. | — | B1 | C1 | D1 | E1 |
| | 260° C. | — | — | C2 | — | — |
| 50 MPa | 220° C. | — | — | D2 | E2 | — |
| | 260° C. | — | B2 | C3 | D3 | — |
| 192 MPa | 220° C. | A1 | — | — | — | — |
| | 260° C. | A2 | — | — | — | — |

For the dry mix C, additional samples were produced using alkaline solution II applying a shaping pressure 50 MPa and a curing temperature of 260° C.

After the curing duration of 24 h, samples were allowed to cool down slowly in order to suppress the formation of cracks due to a thermal shock. After removing from the autoclave cell, specimens of every sample type were boiled for 3 h in water in order to visually investigate their water stability.

Example 5: Characterization of Inorganic Polymer Materials

The compressive strength of the produced samples was tested on an Instron 5985 (load cell 100 kN), applying a crosshead speed of 2 mm/min. Four specimens were measured for each sample type.

Selected samples were analysed using X-ray diffraction as described in "Characterization of raw materials" and compared with spectra of the respective dry mixes. The samples were further analysed using $^{27}$Al MAS NMR spectroscopy.

Example 6: Characterization of Raw Materials

Bauxite comprises as expected mostly of alumina, a substantial amount of iron oxide next to silica and minor titania (Table 3).

TABLE 3

Normalised chemical composition of gibbsitic bauxite and loss on ignition.

| Oxide | $Al_2O_3$ | $Fe_2O_3$ | $SiO_2$ | $TiO_2$ | LOI |
|---|---|---|---|---|---|
| wt % | 71 | 17 | 9 | 2 | 28 |

The mineralogical composition and the recorded diffractogram of gibbsitic bauxite are displayed in FIG. 1.

The gibbsitic bauxite residue is dominated by $Fe_2O_3$ and still a relatively high content of undigested alumina is present, besides silica, titania and minor sodium oxide and calcia (Table 4).

TABLE 4

Normalised chemical composition of gibbsitic BR and loss on ignition.

| Oxide | $Fe_2O_3$ | $Al_2O_3$ | $SiO_2$ | $TiO_2$ | $Na_2O$ | CaO | Other | LOI |
|---|---|---|---|---|---|---|---|---|
| wt % | 49 | 17 | 10 | 9 | 8 | 6 | <1 | 10 |

As regards the mineralogy, main phases are hematite (25 wt %) and goethite (19 wt %), followed by cancrinite (12 wt %), gibbsite (5 wt %), katoite (4 wt %), rutile (1 wt %), quartz (1 wt %) and boehmite (2 wt %), next to amorphous phases.

The industrial clay is characterized by a high content of silica and alumina (Table 5), which is also reflected in the mineralogical composition with quartz (51 wt %), micas (17 wt %), 1:1 clays (15 wt %) and 2:1 clays (7 wt %) next to calcite (9 wt %) and rutile (1 wt %).

TABLE 5

Chemical composition of industrial clay.

| Oxide | $SiO_2$ | $Al_2O_3$ | CaO | $K_2O$ | $Fe_2O_3$ | $TiO_2$ | LOI |
|---|---|---|---|---|---|---|---|
| wt % | 75 | 16 | 6 | 2 | 1 | 1 | 8.5 |

Kaolin comprises mainly of kaolinite (68 wt %) and 2:1 clays (21 wt %), next to K-feldspar (8 wt %) and quartz (3 wt %). Its chemistry is thus dominated by silica (57 wt %) and alumina (38 wt %) with minor quantities of $K_2O$ (3 wt %) and $Fe_2O_3$ (1 wt %).

Example 7 Characterization of the Reaction Products

The synthesised materials were all water stable after boiling in water for 24 h.

Example 8. Mechanical Properties

The mechanical properties of the tested samples are shown in Table 6.

TABLE 6

| Compressive strengths in MPa for tested samples (alkaline solution I). | | | | | | |
|---|---|---|---|---|---|---|
| Shaping pressure | Temperature | A | B | C | D | E |
| 19 MPa | 220° C. | — | 19.5 ± 1.4 | 17.4 ± 2.6 | 27.9 ± 0.5 | 25.0 ± 2.0 |
|  | 260° C. | — | — | 16.5 ± 0.5 | — | — |
| 50 MPa | 220° C. | — | — | 34.5 ± 4.1 | 51.4 ± 3.7 | 66.3 ± 17.1 |
|  | 260° C. | — | 20.0 ± 0.2 | 32.3 ± 1.5 | 29.6 ± 8.1 | — |
| 192 MPa | 220° C. | 80.0 ± 8.2 | — | — | — | — |
|  | 260° C. | 60.2 ± 5.0 | — | — | — | — |

The compressive strengths of mix C, prepared with alkaline solution II, shaping pressure 50 MPa and curing temperature 260° C., show similar values as the samples activated with alkaline solution I, reaching 36.4±0.9 MPa.

All tested mixes have proven their suitability as precursor materials for inorganic polymer materials with adequate strengths for a range of applications. The higher the content of reactive silica in the precursor material, the higher the compressive strength of the final product. The highest compressive strength is achieved in sample A1, but it has to be noted that a higher shaping pressure was applied for that mix.

Example 9. X-Ray Diffraction

Figure 2:
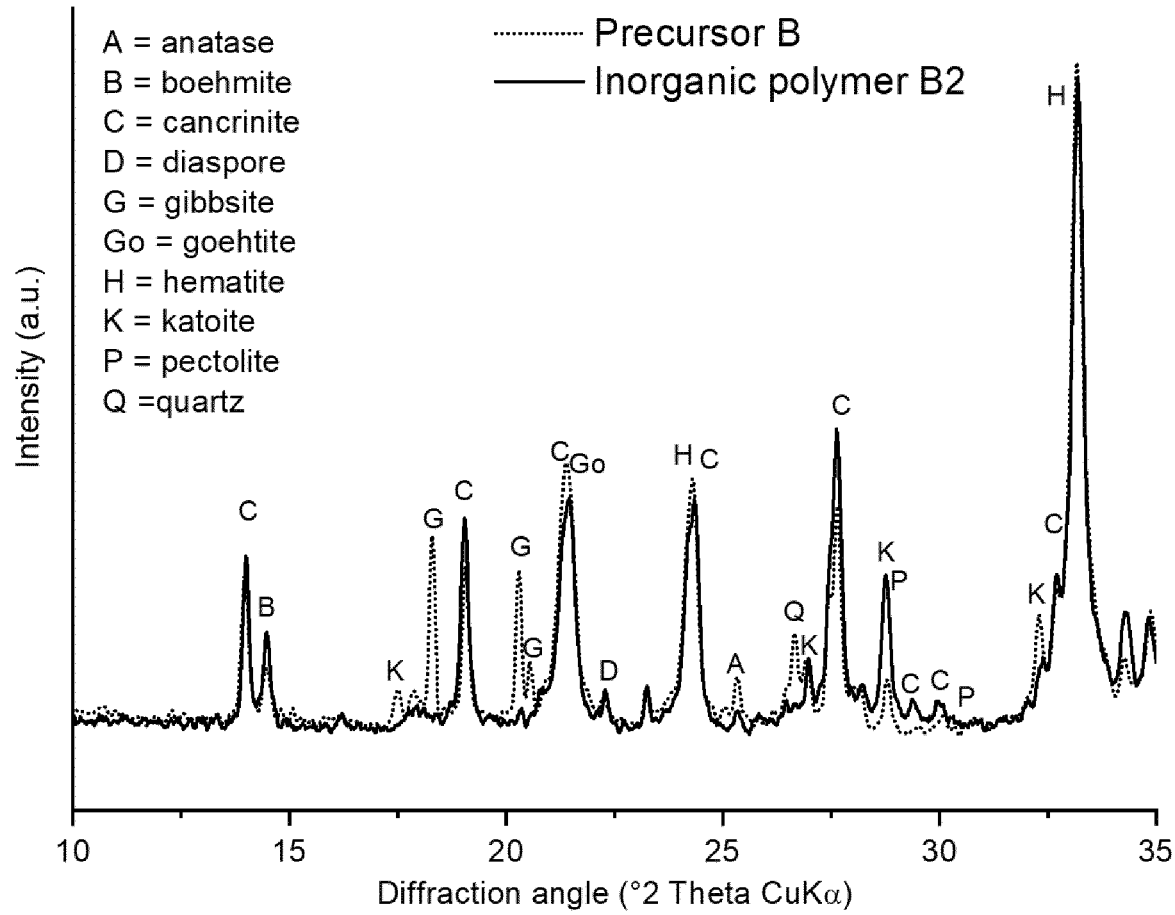
FIG. 2. shows a qualitative X-ray diffractogram of precursor B and inorganic polymer B2. Where B and B2, are defined in the present invention, Table 1 and Table 2.
Figure 3:
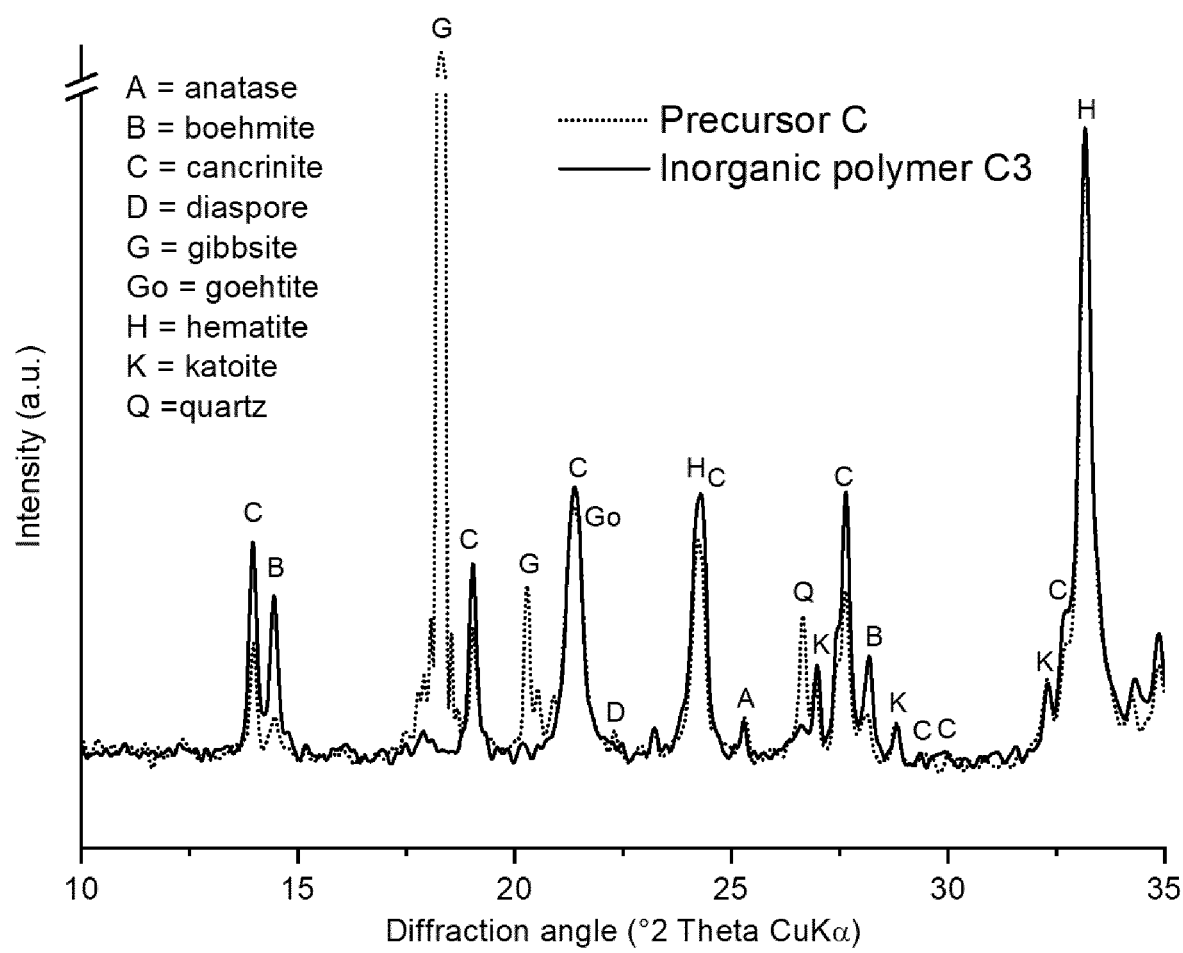
FIG. 3. shows a qualitative X-ray diffractogram of precursor C and inorganic polymer C3. Where C and C3, are defined in the present invention, Table 1 and Table 2.
Figure 4:
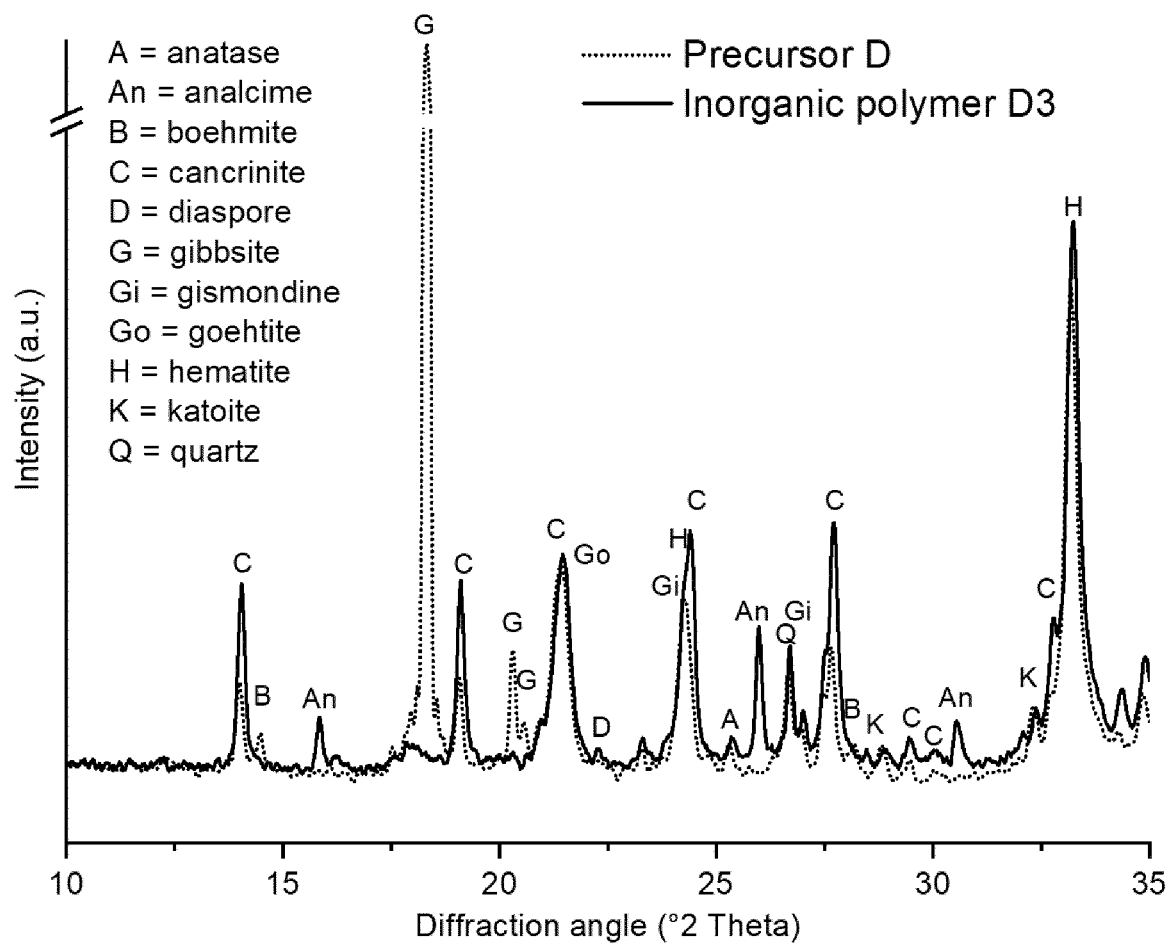
FIG. 4. shows a qualitative X-ray diffractogram of precursor D and inorganic polymer D3. Where D and D3, are defined in the present invention, Table 1 and Table 2.

In FIGS. 2-4, representative XRD scans of the reaction products are compared qualitatively in the range of 10 to 35° 2θ with the respective dry precursor.

FIG. 2 indicates that the changes between the precursor mix B and the IP B2 are mainly concentrated on the phases cancrinite, gibbsite, quartz and katoite. After the hydrothermal curing neither gibbsite nor quartz are detected and also the intensity of the katoite peaks are significantly decreased, which suggests the dissolution of these phases after the autoclaving process. The peak intensities of cancrinite increased and while pectolite peaks appear.

A similar trend can be seen for precursor C and IP C3 (FIG. 3), where cancrinite intensities raised, while gibbsite and quartz peaks disappeared. In contrast to system B, intensities of boehmite increased while katoite remained constant.

In system D (FIG. 4), an increase in cancrinite, boehmite can be observed after activation, while gibbsite is again consumed. Further, the zeolite phases analcime and gismondine are formed.

The XRD data suggest that gibbsite, present in BR and bauxite is digested during autoclaving either releasing aluminates in the pore solution or dehydrating to boehmite. Cancrinite peak intensity is increased in all samples, suggesting the formation of cancrinite in all investigated samples. In the present case, cancrinite formation can possibly be explained by the release of aluminate species (originating from gibbsite dissolution), silicates (from the activation solution or quartz dissolution) and sodium from the activation solution. The formation of the crystalline phases, such as zeolites (i.e. analcime and gismondine), and potentially amorphous structures are believed to be responsible for the setting and the strength development in the hydrothermally cured materials.

Figure 5:
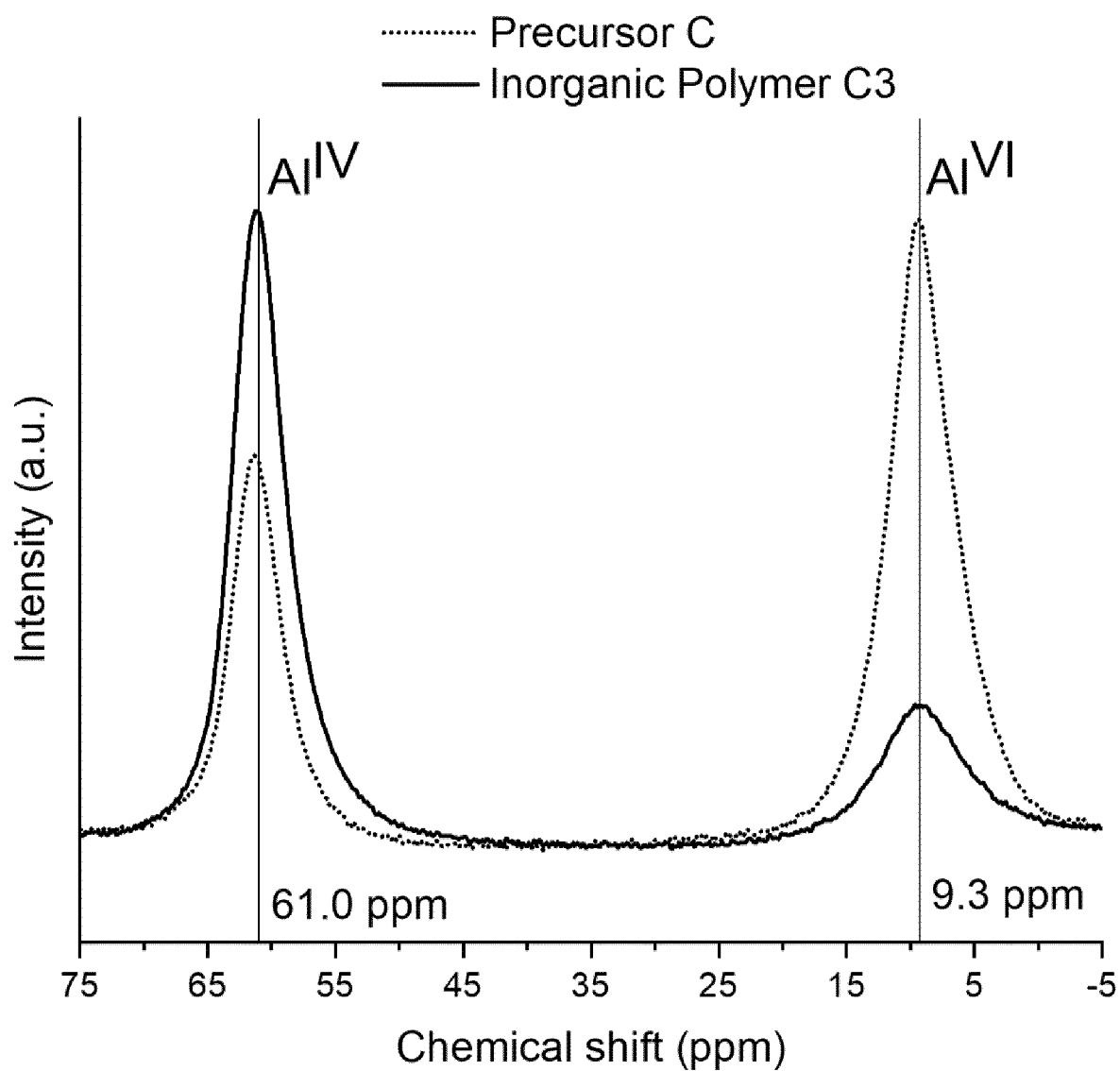
FIG. 5. shows $^{27}Al$ MAS NMR spectra of precursor C and inorganic polymer C3. Where C and C3, are defined in the present invention, Table 1 and Table 2.
Figure 6:
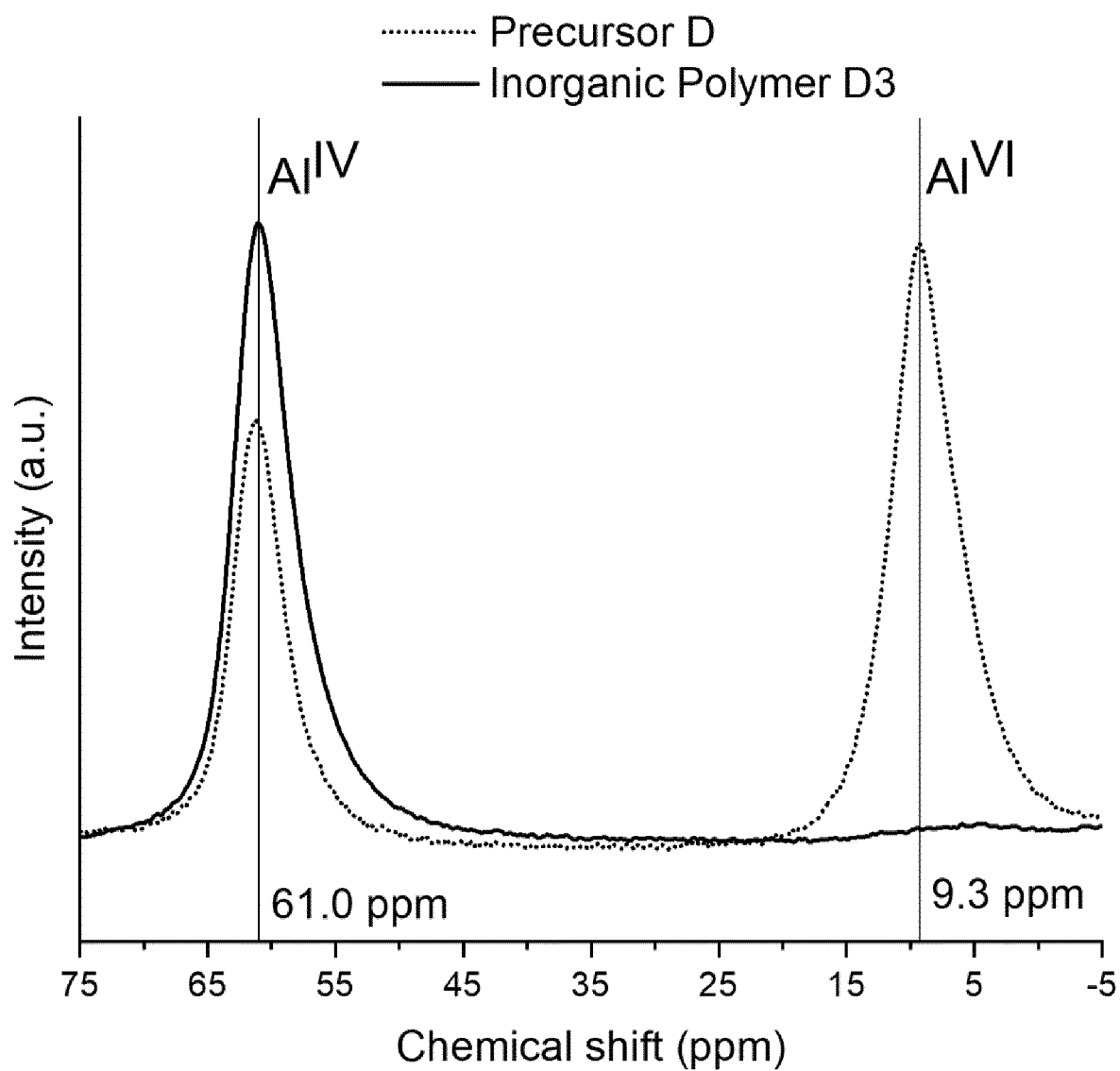
FIG. 6. shows $^{27}Al$ MAS NMR spectra of precursor D and inorganic polymer D3. Where D and D3, are defined in the present invention, Table 1 and Table 2.

These findings are in agreement with the $^{27}$Al MAS NMR data of the precursors C and D and their respective IP (C3 and D3) (FIG. 5 and FIG. 6). A shift from predominantly octahedral aluminium (peak at 9 ppm) originating from gibbsite, kaolinite, towards 61.0 ppm is visible for both samples, which shows a phase transformation to zeolite phases, cancrinite and potentially an amorphous inorganic polymer. The remaining peak at 9.3 ppm in the sample C3 can be due to the formation of boehmite and/or diaspore which have both aluminium in octahedral configuration.

The invention claimed is:

1. A method for manufacturing an inorganic polymer object from a precursor that comprises a gibbsite-containing residue or a thermally processed gibbsite-containing residue of the Bayer process, the precursor comprising less than 0.01 wt % silica fume, the method comprising:
   alkaline-activating the precursor;
   mixing the precursor;
   shaping the precursor after the mixing; and
   hydrothermally curing the precursor, after the shaping, at a temperature from 70° C. to 350° C. and under a pressure greater than 1 bar and less than 500 bar.

2. The method according to claim 1, wherein the gibbsite containing residue comprises gibbsite in an amount greater than 2 wt %.

3. The method according to claim 1, wherein the precursor further comprises a gibbsite containing bauxite or a thermally processed gibbsite containing bauxite.

4. The method according to claim 1, wherein said precursor comprises up to 40 wt % one or more of a component selected from the group consisting of quartz sand, precipitated silica, natural clay, calcareous sand, thermally-activated clay, chemically-activated clay, mechanically-activated clay, fly ash from bituminous coal, subbituminous coal or lignite, gibbsite-containing electrostatic precipitation dust (ESP dust), aluminium salt cake, processed aluminium dross, $CaCO_3$, CaO, $Ca(OH)_2$, monocalcium silicate, dicalcium silicate, tricalcium silicate, metallurgical slag, EN 197-1 blended cement, cement kiln dust, soda-lime-silica glass or other glass compositions, thermally processed bauxite residue, and vitreous slag.

5. The method according to claim 1, wherein the hydrothermal curing is performed under a pressure from 1 bar to 90 bar.

6. The method according to claim 1, wherein the precursor consists of a naturally occurring mineral, of a rock, or of a residue from an ore subjected to the Bayer process.

7. The method according to claim 1, wherein the precursor contains less than 15 wt % diaspore [($\alpha$-AlO(OH)] and less than 15 wt % boehmite [$\gamma$-AlO(OH)].

8. The method according to claim 1, wherein the precursor has a normalized chemical composition, as deduced by X-Ray fluorescence analysis, comprising the following elements, expressed as oxides:
   from 1 wt % to 60 wt % $Fe_2O_3$;
   from 5 wt % to 80 wt % $Al_2O_3$;
   from 0 wt % to 50 wt % $SiO_2$;
   from 0 wt % to 25 wt % $TiO_2$;
   from 0 wt % to 20 wt % $Na_2O$; and
   from 0 wt % to 20 wt % CaO.

9. The method according to claim 1, wherein the precursor has, as determined by a thermogravimetric analysis carried out at a temperature between 25° C. to 1000° C., a loss on ignition or volatile substances from 1 wt % to 40 wt %.

10. The method according to claim 1, wherein the alkaline-activating the precursor comprises contacting the precursor with an alkaline solution selected from one or more of the group consisting of hydroxides, silicates, sulfates, sulfides, sulfites, carbonates of Na- and/or K- and/or Ca, spent Bayer liquor, Na-aluminate solution, and a liquid component of bauxite residue slurry.

11. The method according to claim 1, wherein the alkaline-activating the precursor comprises contacting the precursor with an alkaline solution having a 0.5 mol/L to 28 mol/L equivalent concentration for NaOH and a 0.5 mol/L to 22 mol/L equivalent concentration for KOH.

12. The method according to claim 1, wherein the alkaline-activating the precursor comprises contacting the precursor with a solution that has a total molar ratio of $SiO_2/(Na_2O+K_2O)$ from 0 to 4 and a total molar ratio of $H_2O/(Na_2O+K_2O)$ from 5 to 200.

13. The method according to claim 1, wherein shaping the precursor comprises casting the precursor into a mold, optionally followed by vibration, with a shaping pressure not exceeding 5 MPa.

14. The method according to claim 1, wherein shaping the precursor comprises press-shaping the precursor at a pressure from 5 MPa to 80 MPa.

15. The method according to claim 1, wherein the shaping of the precursor is performed for a time from 1 sec to 10 min.

16. The method according to claim 1, wherein the hydrothermal curing is performed at a temperature from 90° C. to 350° C.

17. The method according to claim 1, wherein the precursor comprises from 0 wt % to less than 0.01 wt % water-soluble silicate in the form of sodium silicate or potassium silicate.

18. The method according to claim 1, wherein the precursor comprises from 0 wt % to less than 0.1 wt % fluoride.

19. The method according to claim 1, wherein the precursor comprises a total from 0 wt % to less than 0.01 wt %, based on the total weight of the precursor, of ground granulated blast furnace slag, basic oxygen furnace slag, kaolin tailings, and coal gangue.

20. The method according to claim 1, wherein the precursor further comprises from 0.05 wt % to 0.3 wt % fibers, based on the total weight of the precursor.

* * * * *